(12) United States Patent
Smith

(10) Patent No.: US 6,771,940 B2
(45) Date of Patent: Aug. 3, 2004

(54) MULTI-CHANNEL PEAK POWER SMOOTHING

(75) Inventor: Andrew D. Smith, Redondo Beach, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 639 days.

(21) Appl. No.: 09/818,881

(22) Filed: Mar. 27, 2001

(65) Prior Publication Data

US 2002/0142739 A1 Oct. 3, 2002

(51) Int. Cl.⁷ .................................................. H04J 13/02
(52) U.S. Cl. .................. 455/103; 455/114.2; 455/116; 455/127.5; 375/260; 375/297; 375/296
(58) Field of Search .......................... 455/103, 114.2, 455/114.3, 127.1, 127.5, 116, 119; 375/260, 296, 297

(56) References Cited

U.S. PATENT DOCUMENTS

| 5,490,172 A | | 2/1996 | Komara | |
|---|---|---|---|---|
| 6,100,771 A | * | 8/2000 | Komiya | 332/103 |
| 6,504,862 B1 | * | 1/2003 | Yang | 375/146 |
| 6,535,720 B1 | * | 3/2003 | Kintis et al. | 455/115.1 |
| 6,662,018 B1 | * | 12/2003 | Kintis et al. | 455/522 |

FOREIGN PATENT DOCUMENTS

EP    0 932 285    7/1999

OTHER PUBLICATIONS

Search Report from corresponding European Patent Application 02 006 693.2.

* cited by examiner

*Primary Examiner*—Edward F. Urban
*Assistant Examiner*—Huy Phan
(74) *Attorney, Agent, or Firm*—Harness, Dickey & Pierce, P.L.C.

(57) ABSTRACT

A multi-channel transmission system and method provide peak power smoothing without additional in-band interference. The system includes a multi-carrier waveform generator for reducing peak amplifier power required to transmit a digital multi-carrier waveform based on a plurality of digital carrier waveforms. A signal conversion system generates an analog multi-carrier waveform based on the digital multi-carrier waveform. The analog multi-carrier waveform has a center frequency and a desired gain over the original signal. A bandpass filter is coupled to the signal conversion system for restriction of the analog multi-carrier output waveform to a desired transmission bandwidth. The multi-carrier waveform generator has a nulling waveform generator coupled to a plurality of single carrier waveform modules for generating a digital nulling waveform based on the retrieved data. The nulling waveform reduces a peak power of the multi-carrier waveform and results in a reduced signal envelope.

18 Claims, 5 Drawing Sheets

MULTI-CHANNEL PEAK POWER SMOOTHING

BACKGROUND OF THE INVENTION

1. Field of the Invention

This invention relates generally to multi-channel transmitters. More particularly, the invention relates to a multi-channel transmission system capable of performing peak power smoothing.

2. Discussion of the Related Art

Wireless communication systems require the coordination of a number of components such as base stations, controllers, and mobile subscriber equipment. Base stations generally function as an interface between the subscriber equipment and the controllers in a given network. Therefore, each of these components must both transmit and receive RF signals to and from the other components of the network.

A number of transmission schemes have been used to transmit signals as described above. It is well documented that earlier communication systems used single channel transmission schemes to provide communication between the above components. In such an approach, each carrier signal has a dedicated signal conversion system (including a power amplifier) for digital-to-analog conversion, frequency conversion, and power amplification. Under this approach, power handling is not as difficult because the power amplifier has a relatively narrow range of operation. Thus, each power amplifier can be smaller, lighter, and therefore less expensive. The overall system costs, however, are extremely high because an amplifier is required for each channel.

With the advent of spread spectrum protocols such as CDMA, multi-channel transmitters have rapidly evolved. Under these protocols a given multi-carrier signal will contain information that is simultaneously transmitted to subscribers that are both near and far away from the transmitter. This type of multi-channel transmission reduces overall system costs due to the fewer number of required amplifiers, but certain difficulties remain. For example, a particularly challenging requirement of multi-channel transmitters continues to be peak power handling.

For example, the power and weight budget of conventional transmitters is largely determined by the output drive design, which must handle worst-case momentary power. In fact, emerging wireless and satellite communications pay a high premium for microwave and millimeterwave output power. Drive power is often the most important cost, size, and weight factor for transceiver systems. The challenge is especially severe in multi-channel applications, where momentary clipping of combined signals quickly leads to intermodulation and distortion. The large disparities between average and peak transmit power for a multi-carrier waveform makes the clipping problem especially severe. A conventional multi-channel transmission system is shown in FIG. 1 at 20.

Under this approach, a carrier combiner 22 digitally sums together a plurality of digital carrier waveforms. The output of the combiner 22 is therefore a basic multi-carrier digital signal having power located at the frequencies dictated by the individual carriers. The bandwidth of the digital multi-carrier waveform is therefore a direct function of the single carrier waveforms. A signal conversion system 24 is coupled to the carrier combiner 22 and generates an analog multi-carrier waveform having a desired center frequency and a desired gain over the original signal. Specifically, a digital-to-analog (D/A) converter 26 is typically coupled to the carrier combiner 22 for converting the digital multi-carrier waveform into the analog multi-carrier waveform. A frequency converter 28 is coupled to the D/A converter 26 for converting the initial center frequency of the analog multi-carrier waveform into the desired center frequency (i.e., either up-converting or down-converting). A power amplifier 30 is coupled to the frequency converter 28 for amplifying the analog multi-carrier waveform based on the desired gain. It is important to note that under the conventional approach, the power amplifier 30 must be able to handle relatively large amounts of power due to "collisions" between the carriers (to be described below).

The basic problem arises from the time-domain nature of the multi-carrier transmit waveform. Individual carriers resemble simple sine-waves with a well-behaved relationship between peak value and root-mean-squared (rms) average value. The sum of several of these well-behaved waveforms does not follow the same property.

FIG. 3 demonstrates that the sum of four unity-amplitude sine-waves produces a total waveform 34 with infrequent but large amplitude swings. In the illustrated case, the voltage magnitude is below 2.5 units with the exception of two brief excursions at points 36 and 38. These brief excursions give rise to intermodulation in a voltage-clamped amplifier.

It is important to note that the problem of peak power handling becomes more challenging as the number of channels is increased. The plot 32 of FIG. 2 shows instantaneous peak power and average power requirements for a multi-channel transmitter, as a function of number of channels. All values are referenced to the power level of a single channel. The plotted peak power shows the instantaneous power exceeds no more than 0.1 percent of the time for randomly phased carriers. It will be appreciated that the illustrated calculation is for power-efficient PSK or FSK waveforms. It can further be seen that a four-channel transmit system requires instantaneous peak power handling capacity of 15 dBc, four times the power handling that four independent amplifiers would require. It is therefore desirable to provide a multi-channel transmission system that compensates for instantaneous peak power resulting from collisions between carriers.

SUMMARY OF THE INVENTION

The above and other objectives are achieved by a multi-channel transmission system and method in accordance with the present invention. The transmission system includes a multi-carrier waveform generator. The waveform must handle the total bandwidth of the set of digital carrier waveforms. A signal conversion system is coupled to the multi-carrier waveform generator and generates an analog multi-carrier waveform based on the digital multi-carrier waveform. The analog multi-carrier waveform has a desired center frequency and a desired gain. The transmission system further includes a bandpass filter coupled to the signal conversion system for decreasing a bandwidth of the analog multi-carrier waveform to a desired transmission bandwidth. Using data from the digital carrier waveforms increases the bandwidth of the digital multi-carrier waveform and reduces the multi-carrier waveform envelope. The result is a significant reduction in the peak power load.

Further in accordance with the present invention, a multi-carrier waveform generator is provided. The multi-carrier waveform generator has a plurality of a single carrier waveform modules for conveying data from a plurality of digital carrier waveforms. The digital carrier waveforms have power within a transmission bandwidth. A nulling waveform generator is coupled to the single carrier waveform modules for generating a digital nulling waveform based on the multi-carrier data. The digital nulling waveform has power entirely outside the transmission bandwidth. The multi-carrier waveform generator further includes a digital summer coupled to the waveform modules and the nulling waveform generator for generating the multi-carrier waveform based on the carrier waveforms and the nulling waveform such that the nulling waveform reduces peak power of the multi-carrier waveform.

In another aspect of the invention a method for increasing a bandwidth of a digital multi-carrier waveform based on data from a plurality of digital carrier waveforms is provided. The method includes the step of conveying data from the plurality of digital carrier waveforms, where the digital carrier waveforms have power within the transmission bandwidth. A digital nulling waveform is then generated based on the retrieved data, where the digital nulling waveform has power entirely outside the transmission bandwidth. The method further provides for generating the digital multi-carrier waveform based on the carrier waveforms and the nulling waveforms such that the nulling waveform reduces peak power of the digital multi-carrier waveform.

BRIEF DESCRIPTION OF THE DRAWINGS

Additional objects, features and advantages of the present invention will become apparent from the following description and the appended claims when taken in connection with the accompanying drawings, wherein:

DETAILED DESCRIPTION OF THE PREFERRED EMBODIMENTS

Figure 4:
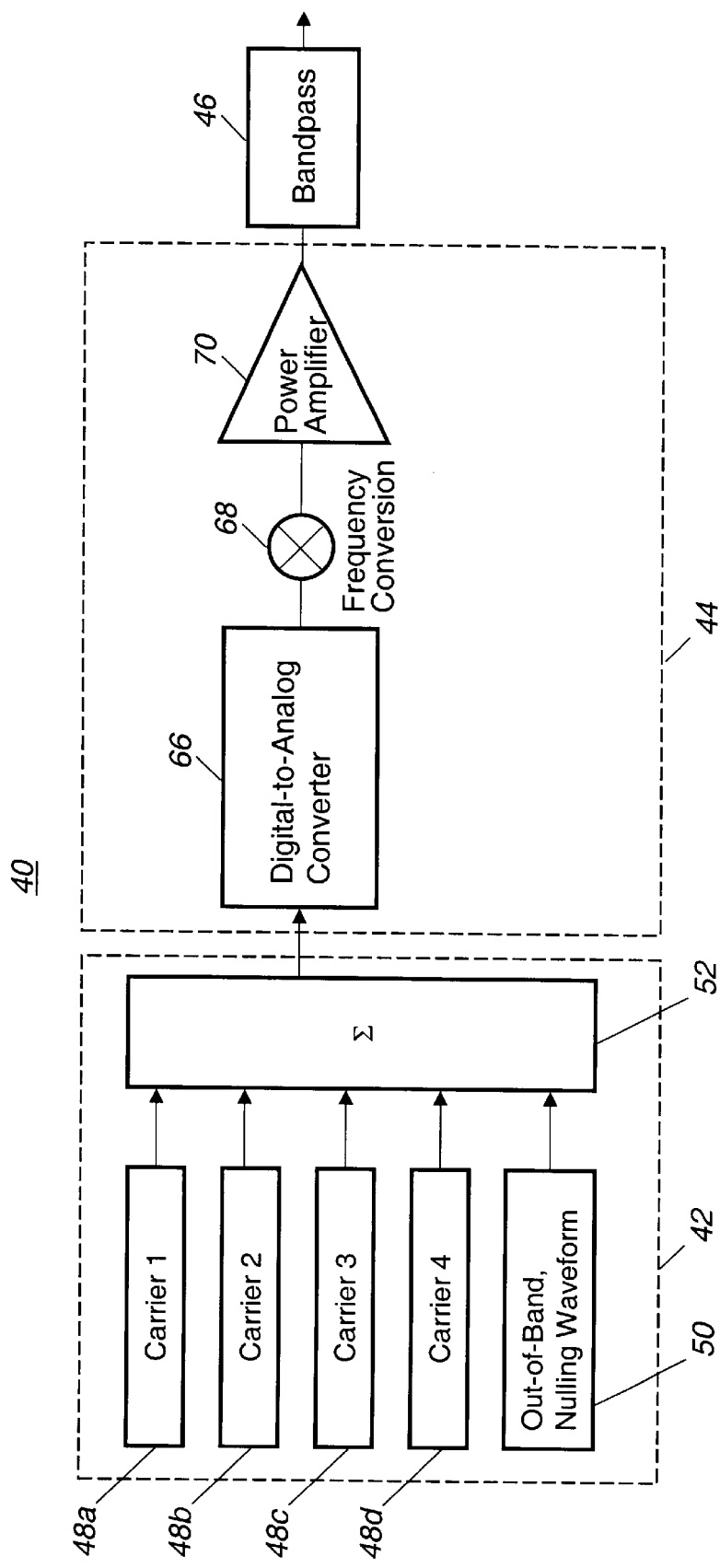
FIG. 4 is a block diagram of a multi-channel transmission system according to one embodiment of the present invention.

Turning now to FIG. 4, the preferred embodiment of a multi-channel transmission system 40 in accordance with the present invention is shown in greater detail. It is important to note that there are certain key characteristics of multi-carrier transmit waveforms that significantly contribute to the effectiveness of the invention. For example, each carrier is known to generally fall within a predetermined, narrow bandwidth. Furthermore, in-phase addition of carriers (collisions) creates potential amplifier overload. This condition occurs frequently enough to be the dominant source of intermodulation. It is also important to note that collisions last for fairly brief periods of time, an amount which is inversely proportional to the difference in carrier frequencies. It is also important to note that knowledge of the carrier waveforms gives the system advanced knowledge of the timing, duration, and amplitude of collision events.

While the preferred embodiment is described with respect to a cellular base station transmitter, it will be appreciated that the present invention is readily applicable to any type of multi-carrier transmitter.

Generally, it can be seen that the multi-channel transmission system 40 has a multi-carrier waveform generator 42, a signal conversion system 44, and a bandpass filter 46. The multi-carrier waveform generator 42 creates a digital multi-carrier waveform based on data from a plurality of digital carrier waveforms. The signal conversion system 44 is coupled to the multi-carrier waveform generator 42 and generates an analog multi-carrier waveform based on the digital multi-carrier waveform. The analog multi-carrier waveform has a desired center frequency and a desired gain over the original waveform. The bandpass filter 46 is coupled to the signal conversion system 44 limits the frequency range of the analog multi-carrier waveform to a desired transmission bandwidth. It is important to note that the term "coupled" is used herein for ease of discussion and is not used in the physical sense per se. Thus, the couplings described can be of an electrical, optical, or electromagnetic nature, or can be any other suitable mechanism for transferring the signal in question.

Using the multi-carrier waveform generator 42 to increase the bandwidth of the digital multi-carrier waveform based on data from the digital carrier waveforms represents a significant improvement over conventional approaches. As will be discussed in greater detail below, adding carefully selected out-of-band power effectively reduces the overall envelope of the signal. Thus the signal conversion system 44 can be designed to handle lower instantaneous peak power than conventional signal conversion systems. Furthermore, the bandpass filter 46 is used to reduce the bandwidth back to the desired transmission bandwidth, and therefore eliminates out-of-band transmission.

It is preferred that the multi-carrier waveform generator 42 has a plurality of single carrier waveform modules 48 for conveying data from a plurality of digital carrier waveforms, where the digital carrier waveforms have power within the transmission bandwidth. A nulling waveform generator 50 is coupled to the single carrier waveform modules 48 for generating a digital nulling waveform based on the retrieved data. The digital nulling waveform has power exclusively outside the transmission bandwidth. It is therefore the nulling waveform that effectively (albeit temporarily) increases the bandwidth of the digital multi-carrier waveform. The multi-carrier waveform generator 42 further includes a digital summer 52 coupled to the waveform modules 48 and the waveform generator 50 for generating the digital multi-carrier waveform based on the carrier waveforms and the nulling waveform. As already discussed, the nulling waveform reduces the peak power of the digital multi-carrier waveform.

Figure 5:
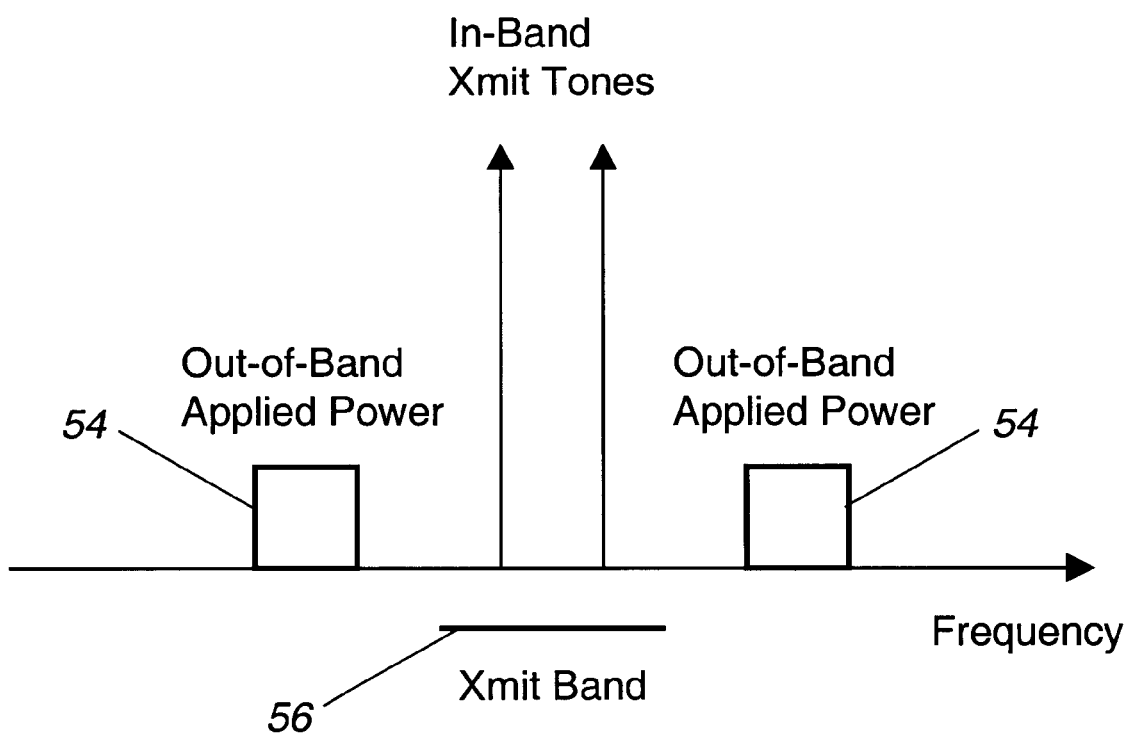
FIG. 5 is a diagram demonstrating the use of a sinc waveform to reduce the peak power of a digital multi-carrier waveform in accordance with one embodiment of the present invention.

With specific regard to the nulling waveform, it will be appreciated that the nulling waveform generator 50 generates the nulling waveform based on data regarding predicted collisions between the digital carrier waveforms. The data regarding predicted collisions preferably includes collision timing data, collision duration data, and collision amplitude data. FIG. 5 demonstrates that in one approach the nulling waveform generator generates rectangular frequency-domain bands 54. Such a spectrum is characteristic of a time domain sinc function. The sinc waveform 54 having power at frequencies above the transmission bandwidth 56 and below the transmission bandwidth. While the example shown in FIG. 5 is for a two-carrier system, it is easy to understand that the sinc waveform 54 is suitable for any number of carriers.

Figure 6:
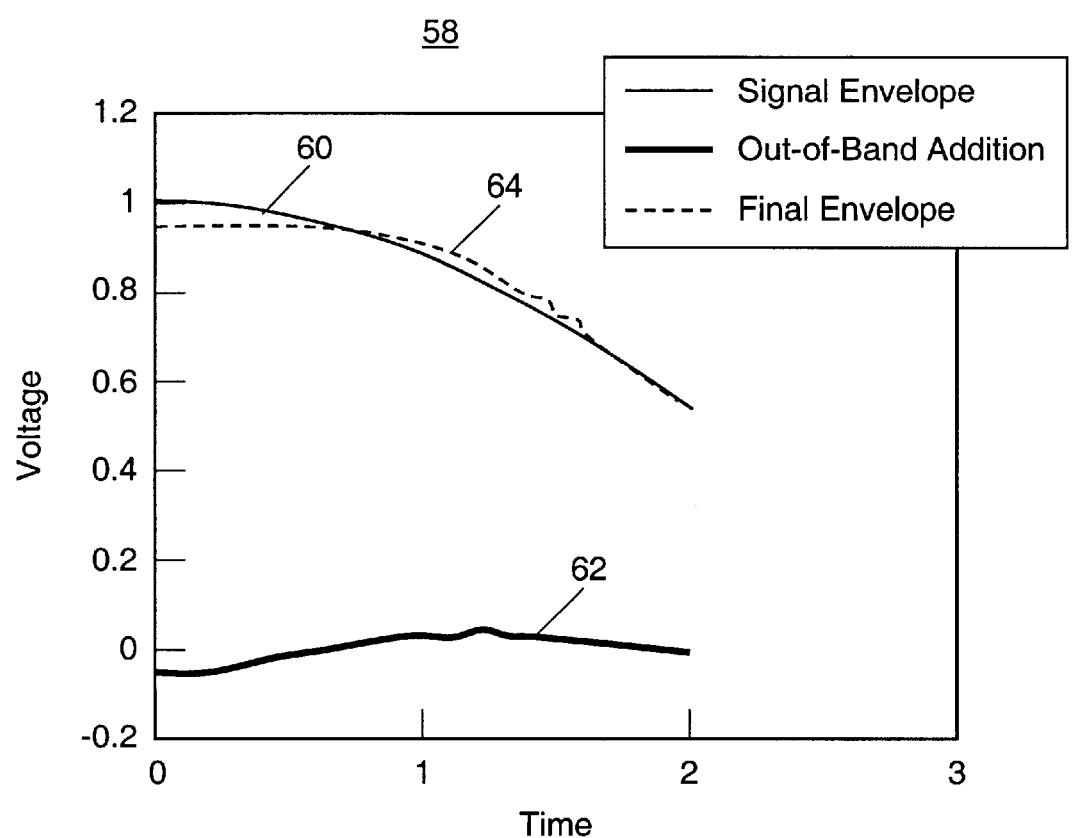
FIG. 6 is a plot of signal envelopes in the time domain demonstrating the effectiveness of the present invention.

Turning now to FIG. 6, plot 58 shows operation of the invention in the time domain. Specifically, it can be seen that at the beat frequency, the two tones produce a cosine-like envelope 60 to the carrier sum waveform. A small amount of out-of-band tower, shown at envelope 62, with less than −20 dBc amplitude is sufficient to reduce the peak sum voltage from 1.0 to 0.95. Thus, a ten percent peak power savings can be obtained as indicated by envelope 64. It is important to note that different nullifying functions may produce larger power savings.

Figure 1:
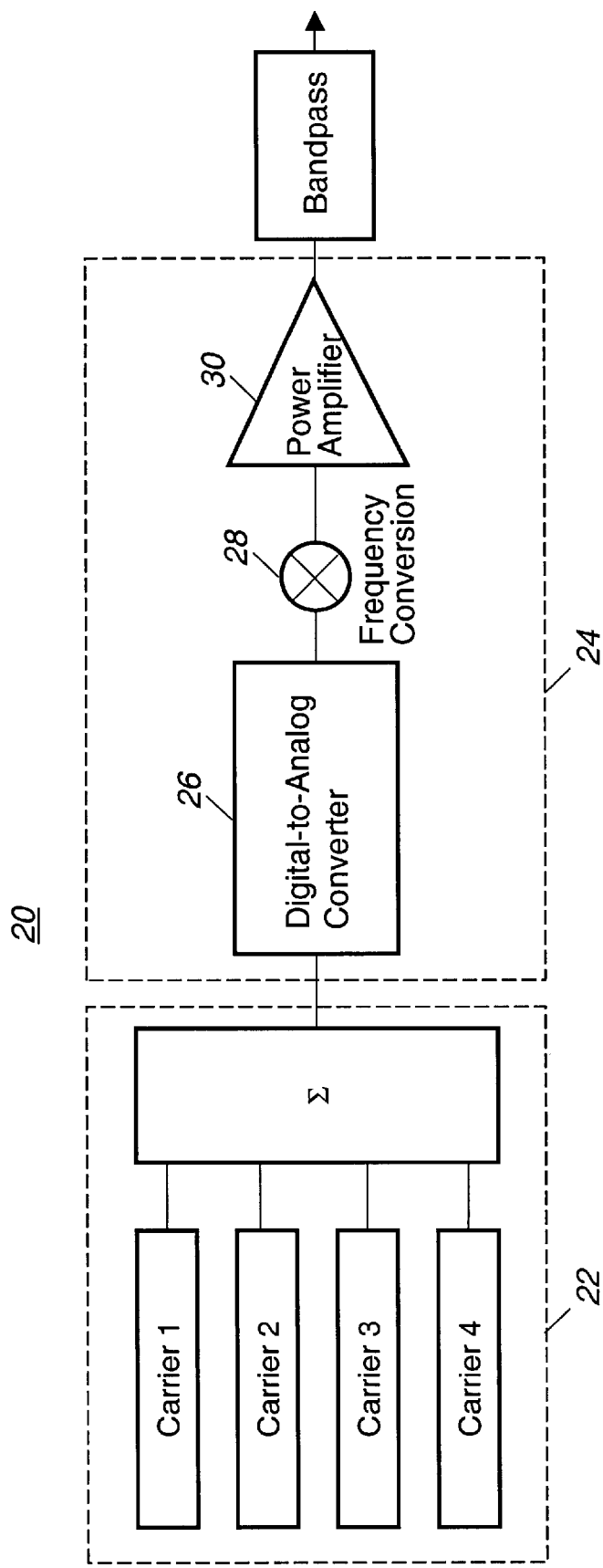
FIG. 1 is a block diagram showing a conventional multi-channel transmission system useful in understanding the invention.
Figure 2:
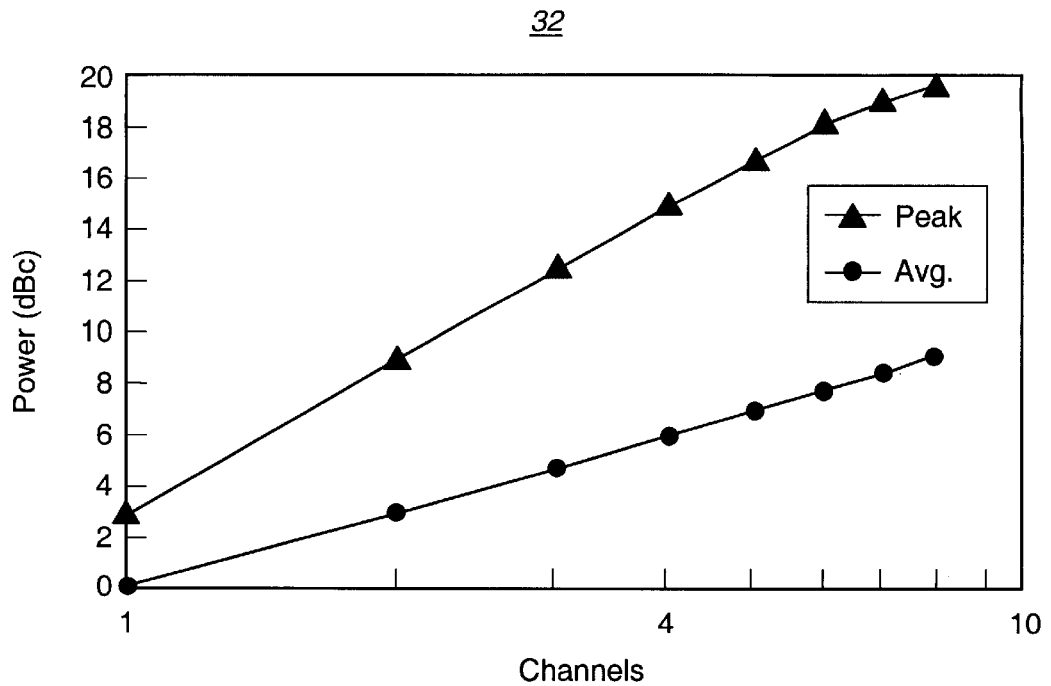
FIG. 2 is a plot showing instantaneous peak power and average power requirements for a conventional multi-carrier transmitter as a function of the number of channels.
Figure 3:
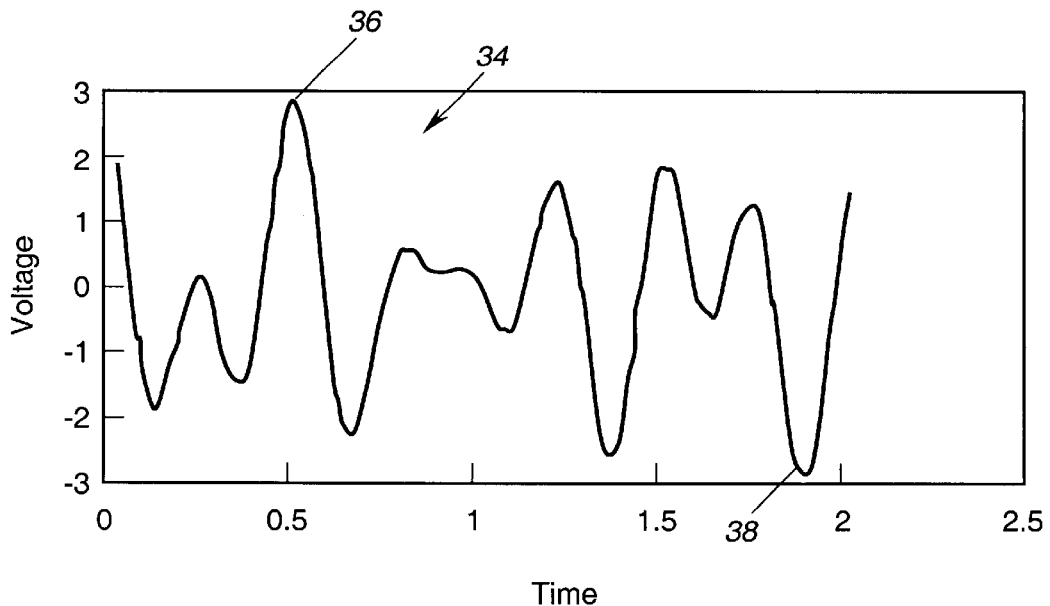
FIG. 3 is a plot of a sum of four unity-amplitude sine-waves useful in understanding the invention.

Returning now to FIG. 4, it can be seen that the preferred signal conversion system 44 has a D/A converter 66, a frequency converter 68, and a power amplifier 70. The D/A converter 66 is coupled to the multi-carrier waveform generator 42 for converting the digital multi-carrier waveform into the analog multi-carrier waveform. The frequency converter 68 is coupled to the D/A converter 66 for converting an initial center frequency of the analog multi-carrier waveform into the desired center frequency (i.e., either up-conversion or down-conversion). The power amplifier 70 is coupled to the frequency converter 68 for amplifying the analog multi-carrier waveform based on the desired gain. It is important to note that the power amplifier 70 of the present invention has a lower power rating than the amplifier 30 shown in FIG. 1 due to the power smoothing of the present invention. The result is a significantly smaller and cheaper multi-channel transmission system 40. Furthermore, when used in conjunction with a digital encoding system, the peak power reduction occurs with no additional in-band interference and no additional parts.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A multi-channel transmission system comprising:
   a multi-carrier waveform generator for increasing a bandwidth of a digital multi-carrier waveform based on data from a plurality of digital carrier waveforms, the multi-carrier waveform generator including:
      a plurality of single carrier waveform modules for retrieving data from a plurality of digital carrier waveforms, the digital carrier waveforms having power within the transmission bandwidth;
      a nulling waveform generator coupled to the single carrier waveform generators for generating a digital nulling waveform based on the retrieved data, the digital nulling waveform having power outside the transmission bandwidth; and
      a digital summer coupled to the waveform modules and the waveform generator for generating the digital multi-carrier waveform based on the carrier waveforms and the nulling waveform such that the nulling waveform reduces a peak power of the digital multi-carrier waveform;
   a signal conversion system coupled to the multi-carrier waveform generator, the signal conversion system generating an analog multi-carrier waveform based on the digital multi-carrier waveform, the analog multi-carrier waveform having a desired center frequency and a desired gain; and
   a bandpass filter coupled to the signal conversion system for decreasing a bandwidth of the analog multi-carrier waveform to a desired transmission bandwidth.

2. The transmission system of claim 1 wherein the nulling waveform generator generates the digital nulling waveform based on data regarding predicted collisions between the digital carrier waveforms.

3. The transmission system of claim 1 wherein the digital summer adds the digital carrier waveforms and the digital nulling waveform together.

4. The transmission system of claim 2 wherein the data regarding predicted collisions includes collision timing data.

5. The transmission system of claim 2 wherein the data regarding predicted collisions includes collision duration data.

6. The transmission system of claim 3 wherein the data regarding predicted collisions includes collision amplitude data.

7. A multi-channel transmission system comprising:
   a multi-carrier waveform generator for increasing a bandwidth of a digital multi-carrier waveform based on data from a plurality of digital carrier waveforms, the multi-carrier waveform generator including:
      a plurality of single carrier waveform modules for retrieving data from a plurality of digital carrier waveforms, the digital carrier waveforms having power within the transmission bandwidth;
      a nulling waveform generator coupled to the single carrier waveform generators for generating a digital nulling waveform based on the retrieved data, the digital nulling waveform generating a sinc waveform having power at frequencies above the transmission bandwidth and power at frequencies below the transmission bandwidth; and
      a digital summer coupled to the waveform modules and the waveform generator for generating the digital multi-carrier waveform based on the carrier waveforms and the nulling waveform such that the nulling waveform reduces a peak power of the digital multi-carrier waveform;
   a signal conversion system coupled to the multi-carrier waveform generator, the signal conversion system generating an analog multi-carrier waveform based on the digital multi-carrier waveform, the analog multi-carrier waveform having a desired center frequency and a desired gain; and
   a bandpass filter coupled to the signal conversion system for decreasing a bandwidth of the analog multi-carrier waveform to a desired transmission bandwidth.

8. A multi-carrier waveform generator comprising:
   a plurality of single carrier waveform modules for retrieving data from a plurality of digital carrier waveforms each having power within a transmission bandwidth;
   a nulling waveform generator coupled to the single carrier waveform generators for generating a digital nulling waveform, having power outside the transmission bandwidth, based on the retrieved data; and
   a digital summer coupled to the waveform modules and the nulling waveform generator for generating the multi-carrier waveform based on the carrier waveforms and the nulling waveform such that the nulling waveform reduces a peak power of the multi-carrier waveform.

9. The multi-carrier waveform generator of claim 8 wherein the nulling waveform generator generates the digital nulling waveform based on data regarding predicted collisions between the digital carrier waveforms.

10. The multi-carrier waveform generator of claim 9 wherein the data regarding predicted collisions includes collision timing data.

11. The multi-carrier waveform generator of claim 9 wherein the data regarding predicted collisions includes collision duration data.

12. The multi-carrier waveform generator of claim 9 wherein the data regarding predicted collisions includes collision amplitude data.

13. A multi-carrier waveform generator comprising:
a plurality of single carrier waveform modules for retrieving data from a plurality of digital carrier waveforms each having power within a transmission bandwidth;
a nulling waveform generator coupled to the single carrier waveform generators for generating a digital nulling waveform, having power outside the transmission bandwidth, based on the retrieved data, the nulling waveform generator generating a sinc waveform having power at frequencies above the transmission bandwidth and power at frequencies below the transmission bandwidth; and
a digital summer coupled to the waveform modules and the nulling waveform generator for generating the multi-carrier waveform based on the carrier waveforms and the nulling waveform such that the nulling waveform reduces a peak power of the multi-carrier waveform.

14. A method for increasing a bandwidth of a digital multi-carrier waveform based on data from a plurality of digital carrier waveforms, the method comprising the steps of:
retrieving data from the plurality of digital carrier waveforms having power within a transmission bandwidth;
generating a digital nulling waveform, based on the retrieved data, having power outside the transmission bandwidth; and
generating the digital multi-carrier waveform based on the carrier waveforms and the nulling waveform such that the nulling waveform reduces a peak power of the digital multi-carrier waveform.

15. The method of claim 14 further including the step of generating the digital nulling waveform based on data predicting collisions between the digital carrier waveforms.

16. The method of claim 15 further including the step of generating the digital nulling waveform based on collision timing data.

17. The method of claim 15 further including the step of generating the digital nulling waveform based on collision duration data.

18. The method of claim 15 further including the step of generating the digital nulling waveform based on collision amplitude data.

* * * * *